United States Patent
Saab et al.

(10) Patent No.: US 12,191,949 B2
(45) Date of Patent: Jan. 7, 2025

(54) METHOD AND APPARATUS FOR ANTENNA PORT SWITCHING IN NEAR FIELD LOS MIMO

(71) Applicant: Samsung Electronics Co., Ltd., Suwon-si (KR)

(72) Inventors: Sandy Saab, Plano, TX (US); Shadi Abu-Surra, Plano, TX (US); Gang Xu, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 410 days.

(21) Appl. No.: 17/676,707

(22) Filed: Feb. 21, 2022

(65) Prior Publication Data

US 2022/0376754 A1 Nov. 24, 2022

Related U.S. Application Data

(60) Provisional application No. 63/190,659, filed on May 19, 2021, provisional application No. 63/191,198, filed on May 20, 2021.

(51) Int. Cl.
*H04B 7/06* (2006.01)
*H04B 17/336* (2015.01)
*H04B 17/382* (2015.01)

(52) U.S. Cl.
CPC ......... *H04B 7/0608* (2013.01); *H04B 7/0619* (2013.01); *H04B 17/336* (2015.01); *H04B 17/382* (2015.01)

(58) Field of Classification Search
CPC .............................. H04B 7/0608; H04B 17/336
See application file for complete search history.

(56) References Cited

U.S. PATENT DOCUMENTS

| 8,855,229 B2 | 10/2014 | Zhang et al. |
| 9,871,284 B2 | 1/2018 | Piazza et al. |
| 10,587,318 B2 | 3/2020 | Ezri et al. |
| 10,763,941 B2 | 9/2020 | Cai et al. |

(Continued)

FOREIGN PATENT DOCUMENTS

WO 2021018305 A1 2/2021

OTHER PUBLICATIONS

International Search Report and Written Opinion issued Jun. 8, 2022 regarding International Application No. PCT/KR2022/003190, 7 pages.

(Continued)

*Primary Examiner* — Zhiren Qin

(57) ABSTRACT

A system and method for an efficient port switching technique for line-of-sight multiple-input multiple-output communications by a base station is provided. The base station includes an antenna array comprising a first number of antenna ports. The base station also includes a transceiver configured to communicate in a wireless communication medium. The base station further includes a processor. The processor is configured to determine, based on the wireless communication medium, one or more parameters of the base station or a receive base station. The processor also is configured to select, based on the one or more first parameters and one or more second parameters, a second number of antenna ports to perform a communication with the receive base station.

20 Claims, 12 Drawing Sheets

(56) References Cited

U.S. PATENT DOCUMENTS

| | | | |
|---|---|---|---|
| 2013/0343302 A1* | 12/2013 | Kim .................... | H04W 72/27 |
| | | | 370/329 |
| 2014/0301495 A1 | 10/2014 | Sohn et al. | |
| 2014/0307702 A1 | 10/2014 | Mese et al. | |
| 2015/0049824 A1* | 2/2015 | Kim .................... | H04B 7/0695 |
| | | | 375/267 |
| 2019/0191346 A1* | 6/2019 | Han .................... | H04W 24/10 |
| 2019/0230606 A1* | 7/2019 | Ryu .................... | H04B 7/043 |
| 2021/0036748 A1 | 2/2021 | Brown et al. | |

OTHER PUBLICATIONS

Yan et al., "Joint Inter-path and Intra-path Multiplexing for Terahertz Widely-spaced Multi-subarray Hybrid Beamforming Systems", arXiv:2101.07936v1 [cs.IT], Jan. 2021, 30 pages.

Zhu et al., "Adaptive Transmit Antenna Selection Based on PCA for Millimeter Wave Los Mimo Channel", IEEE Access, vol. 7, Feb. 2019, pp. 12087-12096.

Benmimoune et al., "Joint Transmit Antenna Selection and User Scheduling for Massive MIMO Systems", 2015 IEEE Wireless Communications and Networking Conference (WCNC 2015)—Track 1: PHY and Fundamentals, Mar. 2015, pp. 381-386.

\* cited by examiner

| D[m] | Hr[m] | H[m] | Theta_t | Theta_r | Optimal Tx-Rx |
|---|---|---|---|---|---|
| 50 | 10 | 0 | 30 | 60 | Tx:14-Rx:13 |
| 50 | 40 | 20 | 20 | 50 | Tx:13-Rx:24 |
| 30 | 10 | 0 | 10 | 0 | Tx:24-Rx:13 |

METHOD AND APPARATUS FOR ANTENNA PORT SWITCHING IN NEAR FIELD LOS MIMO

CROSS-REFERENCE TO RELATED APPLICATIONS AND CLAIM OF PRIORITY

The present application claims priority to U.S. Provisional Patent Application No. 63/190,659, filed on May 19, 2021, and U.S. Provisional Patent Application No. 63/191,198, filed on May 20, 2021. The contents of the above-identified patent documents are incorporated herein by reference.

TECHNICAL FIELD

The present disclosure relates generally to wireless communication systems and, more specifically, the present disclosure relates to a system and method for antenna port switching in near filed line of sight multiple-input multiple-output systems.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

In March 2019, the Federal Communications Commission (FCC) opened the spectrum between 95 GHz and 3,000 GHz for experimental use and unlicensed applications, to encourage the development of new wireless communication technologies. Additionally, discussions on use cases and deployment scenarios for 5G NR systems operating beyond 52.6 GHz bands also have begun. Support for operation in these bandwidths will be included in 3GPP Release 16. It is inevitable that telecommunications will utilize the terahertz (THz) bands for future wireless systems. The THz band is typically defined as the bandwidth ranging from 0.1 THz to 10 THz. A total of 102 GHz spectrum in the range between 95 GHz and 300 GHz is also being made accessible for licensed fixed point-to-point and mobile services through the Spectrum Horizon program. Accordingly, the extremely wideband THz channels with tens of GHz-wide bandwidth could potentially support the Terabits per second (Tbps) communication as required by the future 6G standards.

SUMMARY

The present disclosure relates to wireless communication systems and, more specifically, the present disclosure relates to a system and method for antenna port switching in near filed line of sight multiple-input multiple-output systems.

In one embodiment, a base station is provided. The base station includes an antenna array comprising a first number of antenna ports. The base station also includes a transceiver configured to communicate in a wireless communication medium. The base station further includes a processor. The processor is configured to determine, based on the wireless communication medium, one or more parameters of the base station or a receive base station. The processor also is configured to select, based on the one or more first parameters and one or more second parameters, a second number of antenna ports to perform a communication with the receive base station.

In another embodiment, a method is provided. The method includes determining, based on a wireless communication medium, one or more parameters of a transmit base station or a receive base station. The method also includes selecting, based on the one or more first parameters and one or more second parameters, a second number of antenna ports to perform a communication with the receive base station.

In yet another embodiment, a non-transitory computer readable medium is provided. The non-transitory computer readable medium a plurality of instructions that, when executed by at least one processor, cause the at least one processor to communicate in a wireless communication medium; determine, based on the wireless communication medium, one or more parameters of a transmit base station or a receive base station; and select, based on the one or more first parameters and one or more second parameters, a second number of antenna ports to perform a communication with the receive base station.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
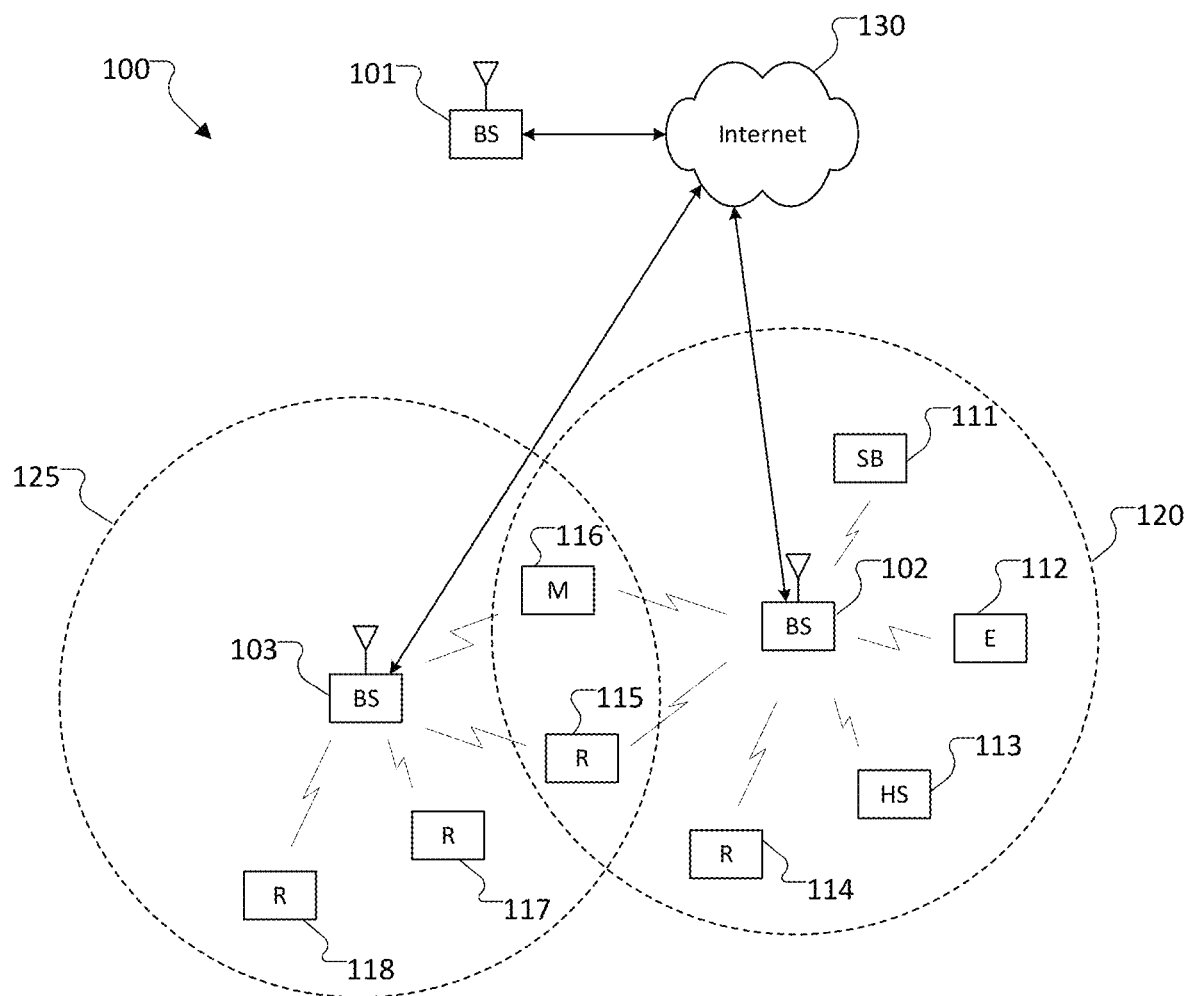
FIG. 1 illustrates an example wireless network according to embodiments of the present disclosure.

FIG. 1 through FIG. 15, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

With the advancement in wireless communication and the arrival of 5G and 6G networks, increased data rates for future networks will create tougher requirements on the capacity of backhaul networks. A backhaul link connects base stations to network controllers. These base stations require microwave radio links for sending and receiving data rather than a direct cable connection. Hence, the throughput of these links should keep up with the demand of that area to avoid additional spectrum purchases.

Wireless MIMO technology emerged as a solution for increased throughput for the same spectrum since it allows multiple transmission/reception of signal streams at the same time. MIMO offers the possibility to significantly increase the transmission capacity of a radio channel. MIMO is extensively used in radio access systems such as wireless local area networks and mobile networks (e.g., LTE, 5GNR). MIMO can offer spatial multiplexing gain for improved spectral efficiency, antenna diversity gain, and adaptive directivity, i.e., beamforming resulting in interference cancellation.

MIMO usually requires a rich scattering environment to work properly and uses a non-line-of-sight (NLoS) component. When MIMO is used in high frequency point-to-point microwave links (mmWave range: 30-330 GHz), it requires highly directional antennas that have a dominant LoS component. At these frequencies, the characteristics of the waves are different than those at lower frequencies and can suffer severe attenuation due to atmospheric oxygen, fog, humidity and rain. For a LoS MIMO system to maintain a spatial multiplexing-diversity gain, the signal streams should be orthogonal to each other either by spatially separating the antennas at the transmitter (TX) and receiver (RX) or by designing orthogonally polarized antennas. Maintaining a full rank and good condition number become essential in preserving the orthogonality of the streams otherwise the channel will be rank deficient (i.e., rank 1) resulting in high inter-symbol-interference that will have severe impact on the bit error rate (BER).

Defining the channel in a LoS MIMO system depends on the geometry of the designed antenna array and the distance of separation between the TX and RX. This will achieve spatial multiplexing gains. The phase of each channel gain is a function of the geometry and carrier frequency. Since future 6G network frequencies is being targeted, the disclosed technology provides a channel matrix that has a carrier frequency of f=140 GHz.

In certain embodiments of the present disclosure, two ports can be chosen from the four available antenna ports that result in a full rank channel matrix and a good condition number at any distance and for a fixed inter-element antenna spacing. Hence continuously providing optimal spectral efficiency regardless of the distance between the TX and RX. It is noted that the number of ports and number of available antennas can have different values such that number of switching ports<number of available antenna ports. For example, two ports can be used to perform the switching from the 4 available). In the LoS MIMO systems certain operation obstacles need to be overcome, such as: 1) Moderating severe attenuation due to atmospheric oxygen, fog, humidity and rain; 2) Using the available spectrum efficiently at mmWave frequencies; 3) Maintaining high data rate demand in backhaul networks; 4) Hardware cost; and 5) Enhancing coverage capability for outdoor scenarios.

Embodiments of the present disclosure provide a design for an optimal linear antenna array for a specific dt, dr such that the channel for different TX/RX combination remains orthogonal. Embodiments of the present disclosure introduce an antenna port switching algorithm that maintains signal stream orthogonality and preserves a good condition number in a Nt×Nr LoS MIMO system for backhaul networks. After defining the channel matrix and understanding the importance of the geometry in maintaining the orthogonality between the signal streams, as a proof-of-concept (PoC) at f=140 GHz, certain embodiments provide an antenna port switching algorithm in a Nt×Nr LoS MIMO channel. Certain embodiments provide a uniform linear array in which the optimum antenna element spacing (dt and dr) is determined for any range D that maintains orthogonal signal streams. For example, choosing Nt=Nr=4, embodiments of the present disclosure select to use two antenna ports from the 4×4 MIMO architecture that maintain full rank and a condition number of 1 (i.e., optimal), leading to an improved bit-error-rate (BER) performance. Embodiments of the present disclosure can be used for any Nt,Nr values greater than 1 (preserve MIMO).

The following documents are hereby incorporated by reference into the present disclosure as if fully set forth herein: Shen, Y. Oda, T. Maruyama, N. Tran and H. Kayama, "Channel improvement for line-of-sight MIMO using dual-beam reflectarray," 2012 6th European Conference on Antennas and Propagation (EUCAP), 2012, pp. 25-29, doi: 10.1109/EuCAP.2012.6206611; M. H. Castañeda Garcia, M. Iwanow and R. A. Stirling-Gallacher, "LOS MIMO Design Based on Multiple Optimum Antenna Separations," 2018 IEEE 88th Vehicular Technology Conference (VTC-Fall), 2018, pp. 1-5, doi: 10.1109/VTCFall.2018.8690668; F. Bohagen, P. Orten and G. E. Oien, "Design of Optimal High-Rank Line-of-Sight MIMO Channels," in IEEE Transactions on Wireless Communications, vol. 6, no. 4, pp. 1420-1425, April 2007, doi: 10.1109/TWC.2007.348338; and J. Eisenbeis, Y. Li, J. Kowalewski, M. Kretschmann and T. Zwick, "Analog 28 GHz LoS MIMO Relay System Using a 90° Hybrid Coupler," in IEEE Antennas and Wireless Propagation Letters, vol. 19, no. 4, pp. 571-575, April 2020, doi: 10.1109/LAWP.2020.2972116.

Figure 2:
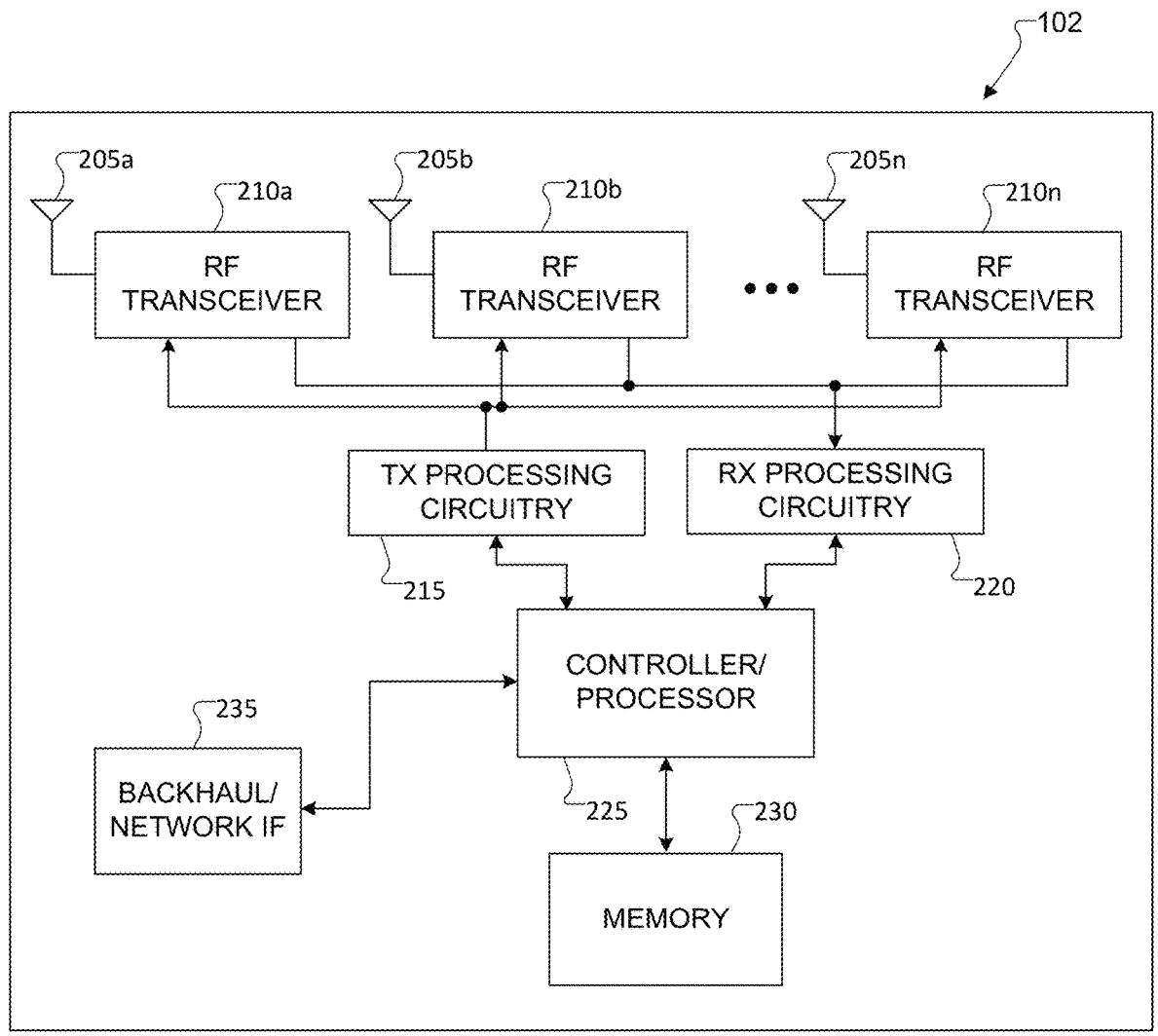
FIG. 2 illustrates an example gNB according to embodiments of the present disclosure.
Figure 3:
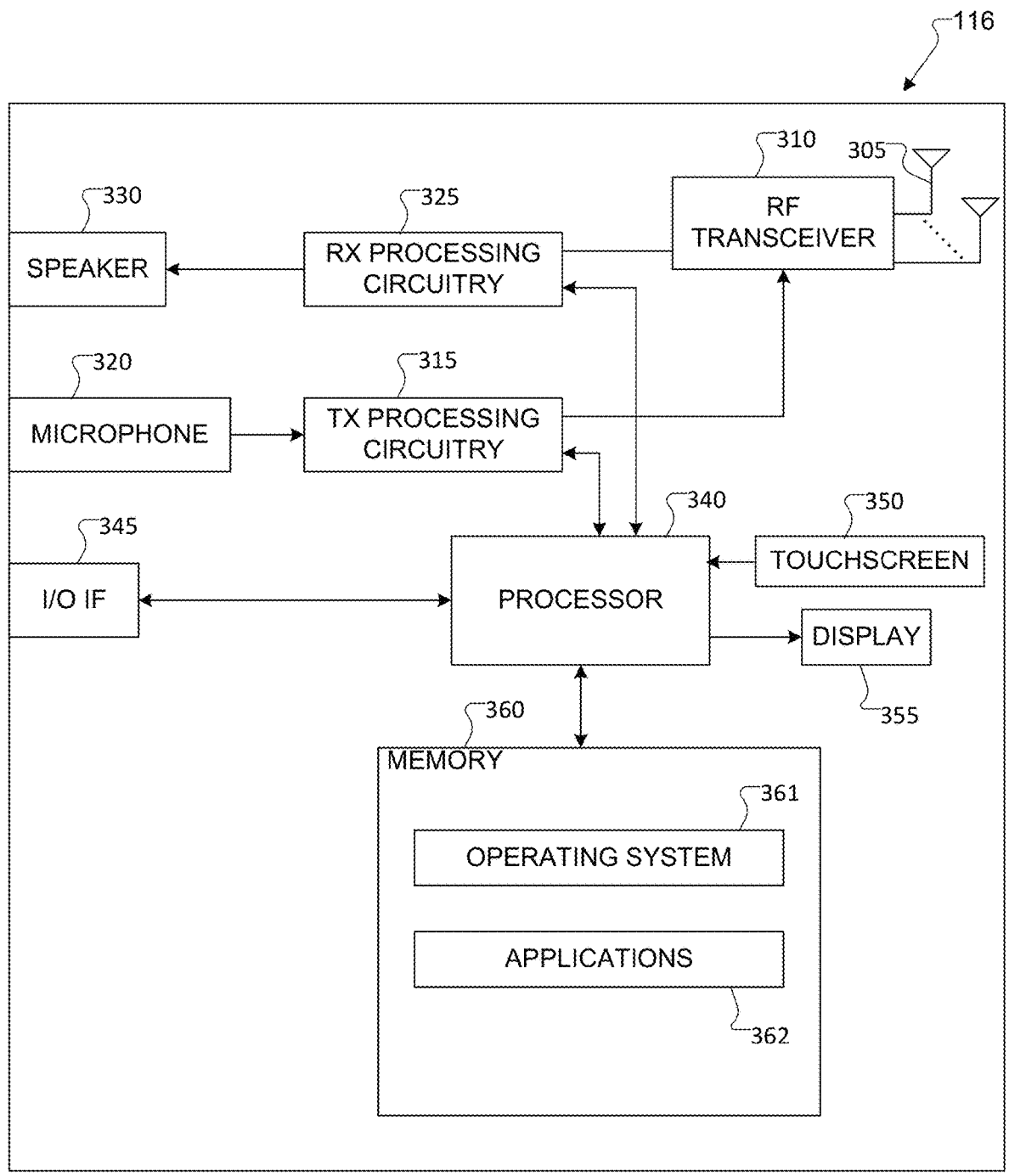
FIG. 3 illustrates an example UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3GPP NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programming, or a combination thereof, for beam management, beamforming, and wireless communications on a 140 GHz link. In certain embodiments, and one or more of the gNBs 101-103 includes circuitry, programming, or a combination thereof for beam management, beamforming, and wireless communications on a 140 GHz link.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple RF transceivers 210a-210n, TX processing circuitry 215, and RX processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of uplink signals and the transmission of downlink signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of uplink signals and the transmission of downlink signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for beam management. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive MIMO, full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancelation and the like.

The discussion of 6G systems and frequency bands associated therewith is for reference as certain embodiments of the present disclosure may be implemented in 6G systems. However, the present disclosure is not limited to 6G systems, or the frequency bands associated therewith, and embodiments of the present disclosure may be utilized in connection with any frequency band.

A communication system includes a downlink (DL) that refers to transmissions from a base station or one or more transmission points to UEs and an uplink (UL) that refers to transmissions from UEs to a base station or to one or more reception points.

A time unit for DL signaling or for UL signaling on a cell is referred to as a slot and can include one or more symbols. A symbol can also serve as an additional time unit. A frequency (or bandwidth (BW)) unit is referred to as a resource block (RB). One RB includes a number of sub-carriers (SCs). For example, a slot can have duration of 0.5 milliseconds or 1 millisecond, include 14 symbols and an RB can include 12 SCs with inter-SC spacing of 15 KHz or 30 KHz, and so on.

DL signals include data signals conveying information content, control signals conveying DL control information (DCI), and reference signals (RS) that are also known as pilot signals. A gNB transmits data information or DCI through respective physical DL shared channels (PDSCHs) or physical DL control channels (PDCCHs). A PDSCH or a PDCCH can be transmitted over a variable number of slot symbols including one slot symbol. For brevity, a DCI format scheduling a PDSCH reception by a UE is referred to as a DL DCI format and a DCI format scheduling a physical uplink shared channel (PUSCH) transmission from a UE is referred to as an UL DCI format.

A gNB transmits one or more of multiple types of RS including channel state information RS (CSI-RS) and demodulation RS (DMRS). A CSI-RS is primarily intended for UEs to perform measurements and provide CSI to a gNB. For channel measurement, non-zero power CSI-RS (NZP CSI-RS) resources are used. For interference measurement reports (IMRs), CSI interference measurement (CSI-IM) resources associated with a zero power CSI-RS (ZP CSI-RS) configuration are used. A CSI process includes NZP CSI-RS and CSI-IM resources.

A UE can determine CSI-RS transmission parameters through DL control signaling or higher layer signaling, such as radio resource control (RRC) signaling, from a gNB. Transmission instances of a CSI-RS can be indicated by DL control signaling or be configured by higher layer signaling. A DMRS is transmitted only in the BW of a respective PDCCH or PDSCH and a UE can use the DMRS to demodulate data or control information.

Figure 4:
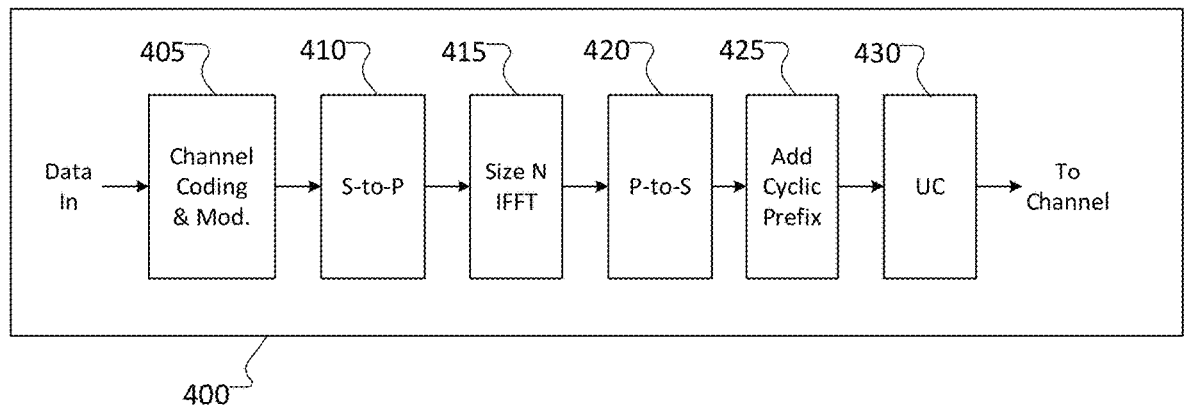
FIGS. 4 and 5 illustrate example wireless transmit and receive paths according to this disclosure.
Figure 5:
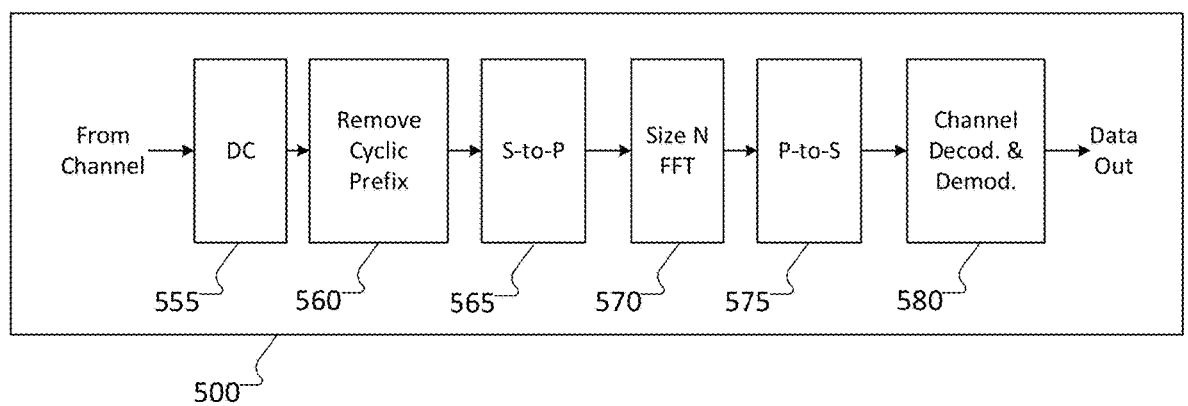

FIG. 4 and FIG. 5 illustrate example wireless transmit and receive paths according to this disclosure. In the following description, a transmit path 400 may be described as being implemented in a gNB (such as the gNB 102), while a receive path 500 may be described as being implemented in a UE (such as a UE 116). However, it may be understood that the receive path 500 can be implemented in a gNB and that the transmit path 400 can be implemented in a UE. In some embodiments, the receive path 500 is configured to support adapting a channel sensing threshold as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 4, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols.

The serial-to-parallel block 410 converts (such as demultiplexes) the serial modulated symbols to parallel data in order to generate N parallel symbol streams, where N is the IFFT/FFT size used in the gNB 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the gNB 102 arrives at the UE 116 after passing through the wireless channel, and reverse operations to those at the gNB 102 are performed at the UE 116.

As illustrated in FIG. 5, the down-converter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the gNBs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the gNBs 101-103 and may implement the receive path 500 for receiving in the downlink from the gNBs 101-103.

Each of the components in FIG. 4 and FIG. 5 can be implemented using only hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 515 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

Figure 6:
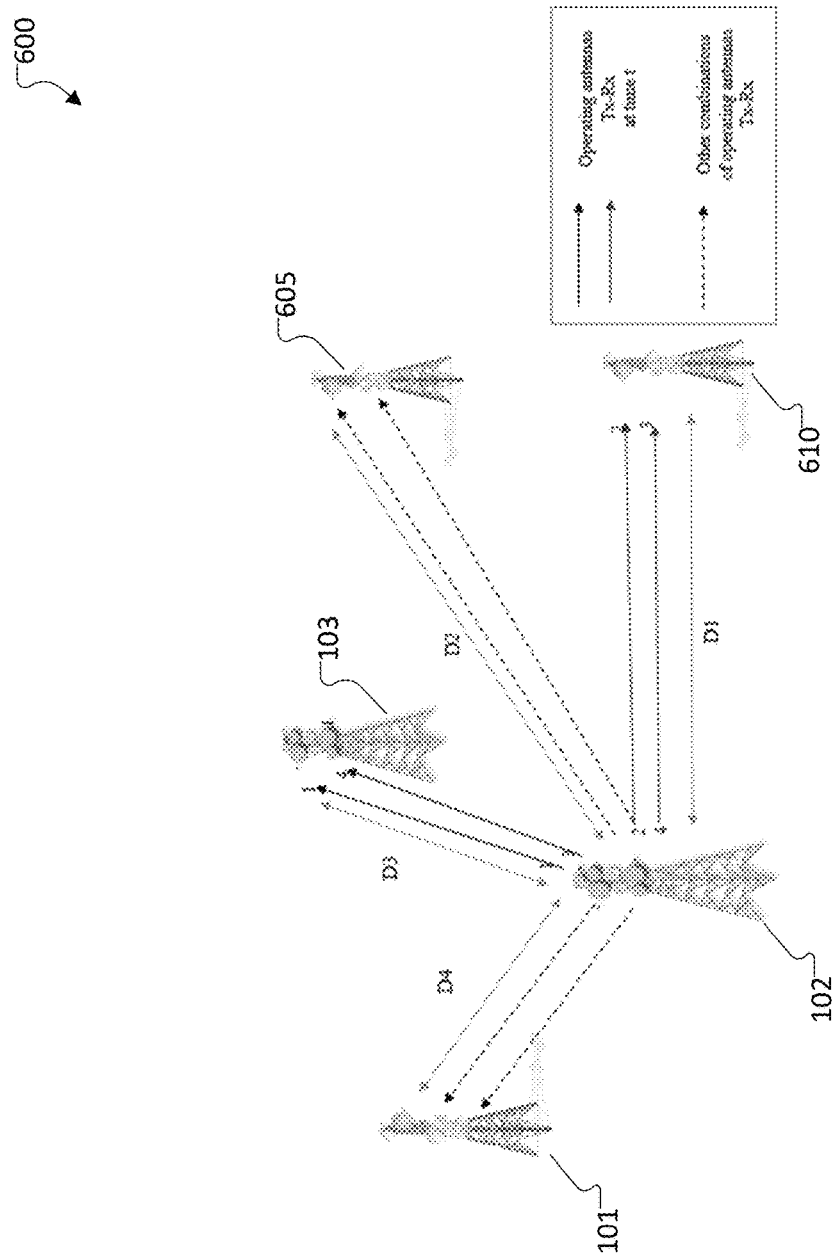
FIG. 6 illustrate an example of antenna operation for base stations at different distances in a wireless network according to embodiments of the present disclosure.

FIG. 6 illustrate an example of antenna operation for base stations at different distances in a wireless network according to embodiments of the present disclosure. The embodiment of the wireless network 600 shown in FIG. 6 is for illustration only. Other embodiments could be used without departing from the scope of the present disclosure.

In the example shown in FIG. 6, gNB 102 is configured to communicate with gNB 101, gNB 103, gNB 605, and gNB 610. The gNB 102 is disposed at different TX/RX distances from each of gNB 101, gNB 103, gNB 605, and gNB 610. For example, gNB 102 is disposed at a first distance, D1, from gNB 610, at a second distance, D2, from gNB 605, at a third distance, D3 from gNB 103, and at a fourth distance, D4, from gNB 101. Additionally, each of the base stations is located at different heights. Since each of the different base station may have a different structure, different distance, and different tilts and heights, finding dt, dr becomes essential to maintain a good link between the backhaul networks. In certain embodiments, the base stations include antenna arrays designed for communications by TX and RX base stations. The gNB 102 is configured with an algorithm to determine which antenna ports at the transmitter and receiver side are activated based on the wireless propagation medium. In certain embodiments, the antenna array spacing, and design is configured based on the distance between the transmitters and receivers, the height at the TX side and the height at the RX side and the tilt angles at the transmitters' side and receivers' side. In certain embodiments, the algorithm is configured to, in response to receiving an input for the base station locations in a mesh network, calculate a first capacity using a subset of different antenna ports of the transmit base station and a subset of different antenna ports at the RX base station by subtracting the maximum distance between the base stations with the minimum between the base stations; and calculate a first capacity using a subset of different antenna ports of the transmit base station and a subset of different antenna ports at the receive base station by taking the average distance between the base stations. In certain embodiments, the algorithm is configured to select the larger capacity between the first capacity and the second capacity. After selecting the larger capacity value, the antenna array spacing is configured and the resulting space between the antenna ports at the TX side and the antenna ports at the RX side are configured. In certain embodiments, after designing the antenna array, for a specific set of transmitter base station and receiver base station at a specific distance from each other, a subset of ports of the designed antenna array are activated at the TX side and RX side to maintain a good condition number of the channel matrix and highest spectral efficiency.

Figure 7:
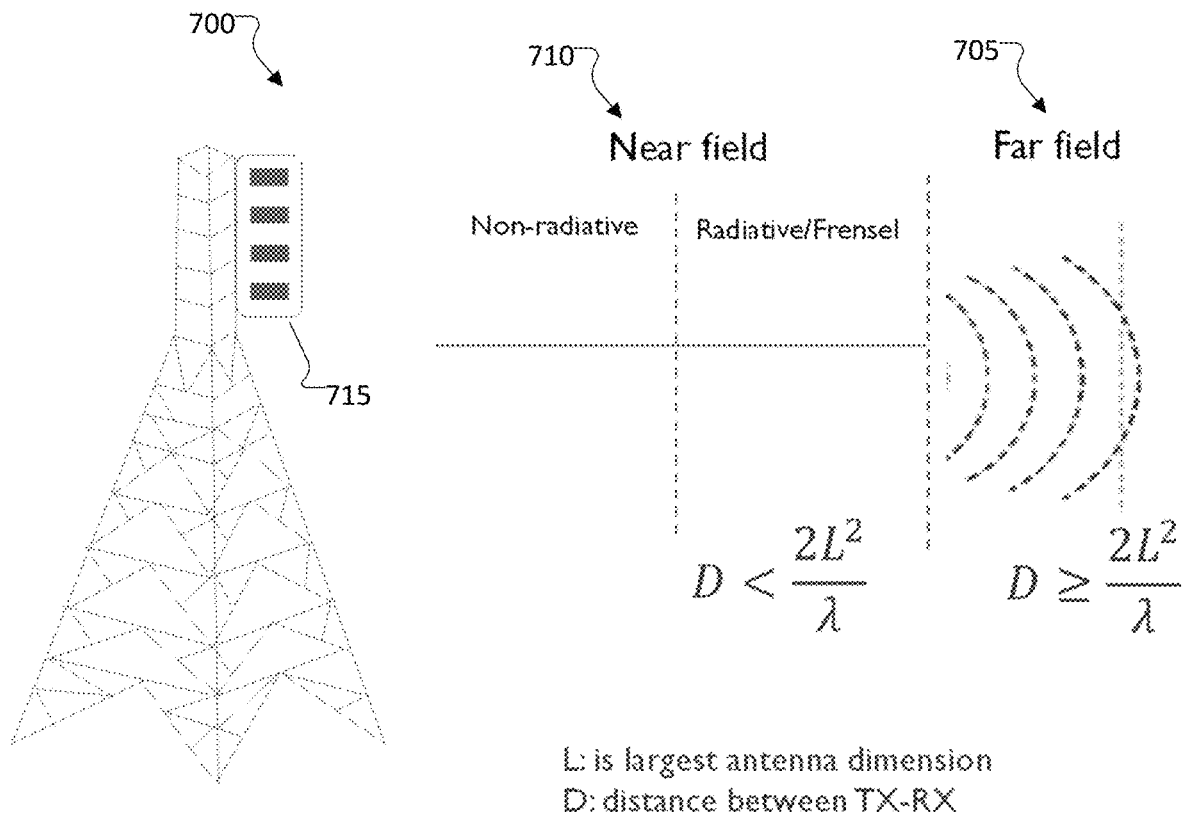
FIG. 7 illustrates near field and far field propagation mediums according to embodiments of the present disclosure.

FIG. 7 illustrates near field and far field propagation mediums according to embodiments of the present disclosure. The near field and the far field mediums are identified according to the largest dimension of the antenna used and the frequency of operation. For LoS MIMO at THz, the wave propagates in the near filed medium. Other embodiments could be used without departing from the scope of the present disclosure.

MIMO is susceptible to losses, such as due to molecular absorption. For example, a MIMO signal could attenuate up to 10 to the power three decibels (dB) or 10 to the power four dB depending upon a temperature and depending upon a molecule, especially at high frequency ranges. When operating at low frequencies, the molecular absorption, or particles such as water vapor, may not be significant because, at low frequency, losses are minor because the wave characteristic is basically different. Signals high frequencies may be subject to the atmospheric losses and attenuation. Therefore, the MIMO signal should be very strong.

Additionally, when transmitting into high frequencies, the transmitter is no longer radiating in the far field region 705; rather the transmitter is operating in the near field region 710. The transmitter operates in the near field region 710 because the transmitter antenna 715 installed on the base station has dimensions that depend on that distance between transmitter and receiver, essentially having that nearfield property.

As shown in the example depicted in FIG. 7, the waves are no longer planar. The waves are more spherical, which presents additional challenges when increasing in frequencies that are in the near field 710 as well as due to the molecular absorption. Additionally, the channels may be low rank. When a channel a channel rank is low, the matrix entries of the channel indicate that rather than having multiple streams, the transmitter is transmitting only one stream. Transmitting a single stream, instead of the multiple MIMO streams, results in losing data rates because the transmitter is unable to place all of the data on only one stream.

Additionally, with respect to backhaul networks, such as communications between base stations and communications between the base station and a backhaul network, the base station may use LoS. LoS means that the transmitter and the receiver can physically see each other, i.e., there are minimal to no objects in between. It is desirable to have the LoS component be as stable as possible to preserve that MIMO functionality.

MIMO systems provide benefits such as multiplying capacity in which the LoS MIMO enables transmission of two independent bit streams over the same frequency and same polarization. A 2×2 MIMO configuration provides more capacity as compared to a SISO link, without wasting additional spectrum resources. Using both polarizations of a frequency channel, such as by employing a 4×4 MIMO scheme, results in four independent bit streams over the same frequency channel. LoS MIMO also enables reduced spectrum licensing fees. MIMO focuses on multiplying capacity and improving spectral efficiency. With more data transmitted over less spectrum, operators can save up to 75% on frequency license-related operating expenses. LoS MIMO also enables immunity to dispersive fading in which spatially separated antennas provide space-diversity link protection resulting in higher immunity to dispersive fading than SISO links. Additionally, LoS MIMO provides improved system gain by combining received signals from both antennas boosts system gain by 3 dB; achieving longer link distances, reduced antenna sizes, or spectrum decongestion by utilizing higher frequencies for long-distance links. Using LoS MIMO, an improvement of as much as 20 dB can be achieved.

Embodiments of the present disclosure provide a system and method directed to challenges in LoS MIMO. The challenges in LoS MIMO include: having two spatially separated transmitting antennas operating in the same bandwidth and carrier frequency will create gain patterns in the far field called grating lobes; LoS channel capacity can be greatly affected by simple changes in TX to RX distances or orientation of the antenna arrays relative to one another or the presence of obstacles in the signal's path=>Channel matrix is no longer full rank and ill-conditioned; and maintaining an orthogonal channel for interference cancellation.

Figure 8:
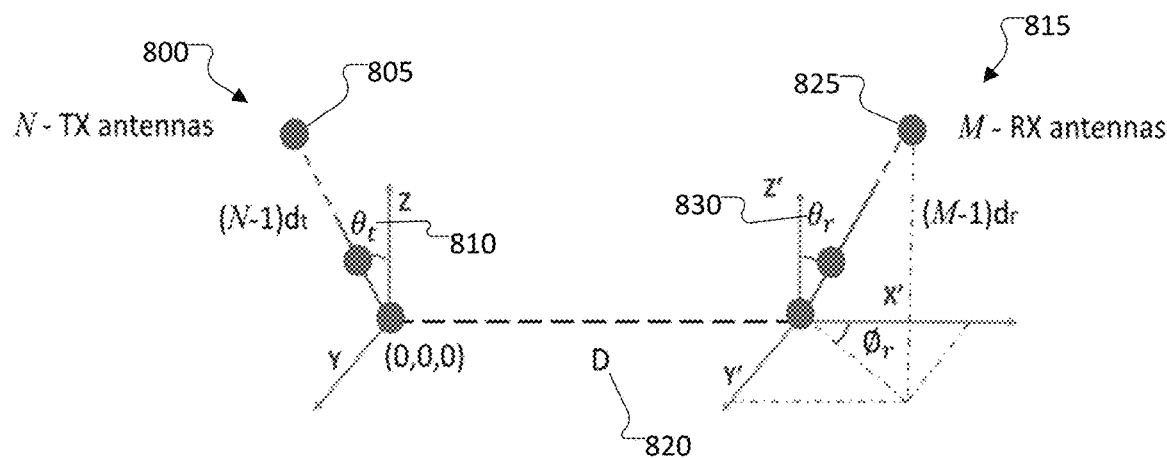
FIG. 8 illustrates multiple-input multiple-output (MIMO) antenna configurations according to embodiments of the present disclosure.

FIG. 8 illustrates MIMO antenna configurations according to embodiments of the present disclosure. The embodiment of the MIMO antenna configurations shown in FIG. 8 is for illustration only. Other embodiments could be used without departing from the scope of the present disclosure.

The LoS channel is described by the geometry of the antenna placements. That is, finding the optimal configuration is a geometrical problem. The transmitter 805 includes a number (N) of antenna ports with an inter-port spacing of dt. Each of the antenna ports is disposed at a particular tilt angle ($\theta$t) 810. A receiver 815 is disposed at a distance D 820 from the transmitter 800. The receiver 815 includes a number (M) of antenna ports 825 with an inter-port spacing of dr. Each of the antenna ports is disposed at a particular tilt angle ($\theta$r) 830.

Figure 9A:
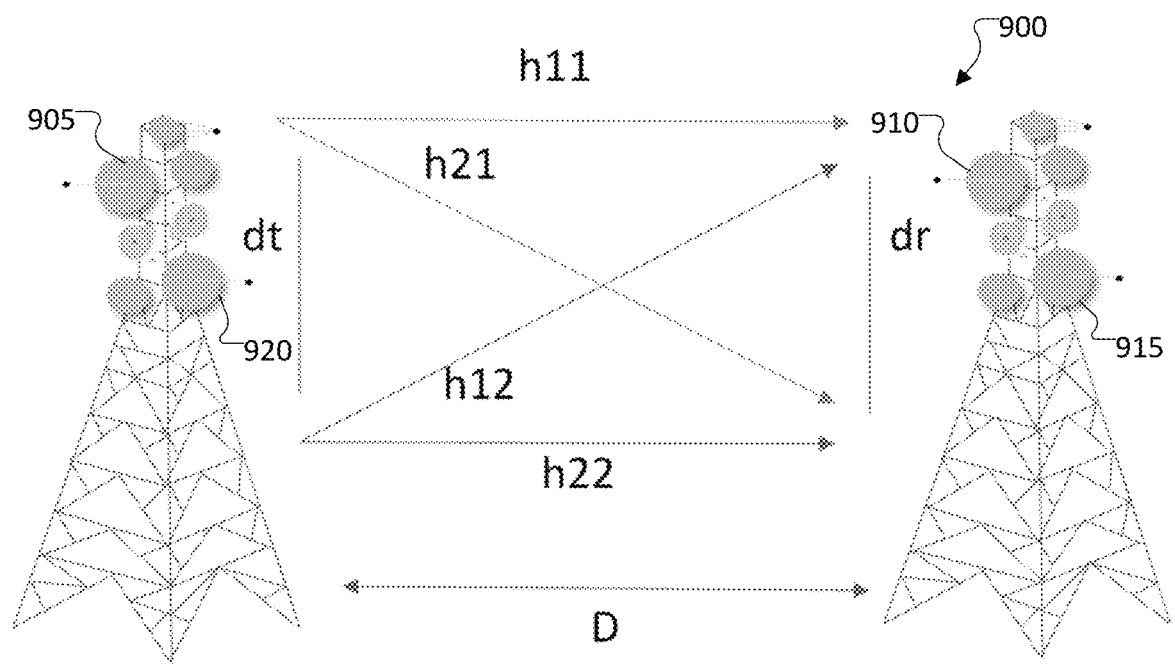
FIGS. 9A-9B illustrates an example line-of-sight MIMO antenna setup according to embodiments of the present disclosure.
Figure 9B:
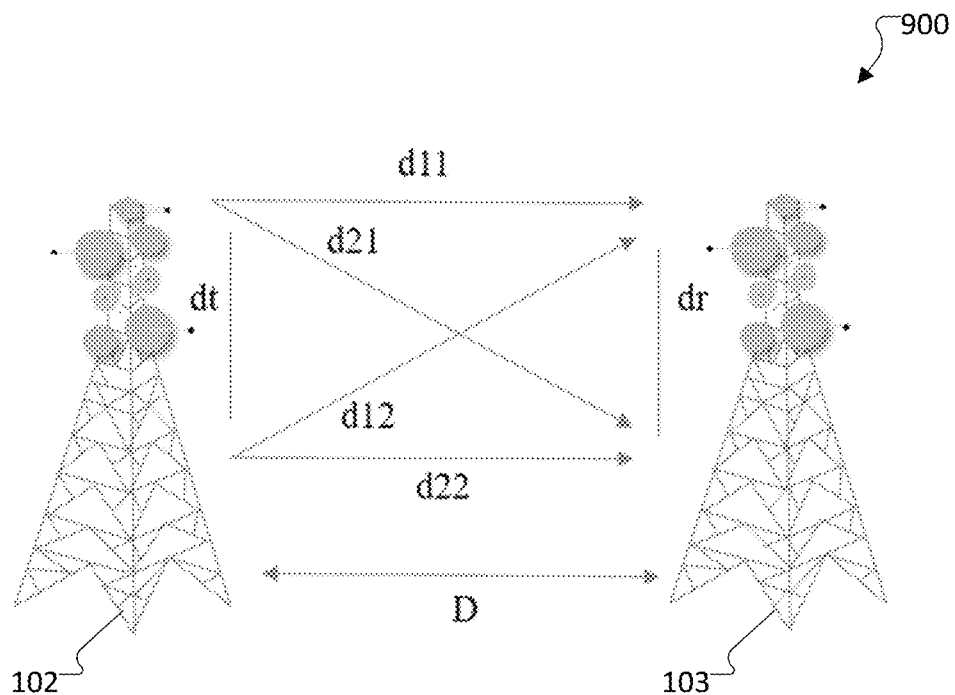

FIGS. 9A-9B illustrates an example line-of-sight MIMO antenna setup according to embodiments of the present disclosure. The embodiments of the MIMO antenna setup 900 shown in FIGS. 9A-9B is for illustration only. Other embodiments could be used without departing from the scope of the present disclosure. For simplicity, a general LoS MIMO antenna setup is depicted in FIGS. 9A-9B.

LoS MIMO achieves spatial multiplexing by deliberate separation of antennas. The phase of each channel gain $h_{nm}$ is a function of the geometry and carrier frequency. LoS MIMO is not governed by a statistical distribution as in non-LoS MIMO.

In a MIMO antenna setup 900, a first transmitter port (TX1) 905 communicates via a first channel, with gain $h_{11}$, with a first receiver port (RX1) 910 and via a second channel, with gain $h_{12}$, with a second receiver port (RX2) 915. Additionally, a second transmitter port (TX2) 920 communicates via a third channel, with gai $h_{21}$, with a first receiver port (RX1) 910 and via a fourth channel, with gain $h_{22}$, with a second receiver port (RX2) 915.

In the example depicted in FIG. 9B, the MIMO antenna setup 900 is disposed on eNB 102, operating as a transmitter base station, and eNB 103, operating as a receiver base station. The best LoS MIMO link needs to satisfy an optimal antenna separation to avoid losing the peak capacity. An optimal $<h_n, h_i>_{n \neq i}$ LoS MIMO antenna separation results in a BER threshold improvement. Sub-optimal antenna separation results in higher BER. Therefore, the antenna array geometry becomes essential for maintaining orthogonality between the channels. The LoS channel is defined as H and the orthogonality is maintained when the inner product of each row is zero, that is $<h_n, h_i>_{n \neq i}=0$. Varying the separation between the transmitting and receiving antennas a static phase shift between the antennas can be introduced thus effecting the channel matrix. In the channel matrix H, Nt is the number of Tx antennas and Nr is the number of RX antennas. The channel matrix can be as follows:

$$H = \begin{bmatrix} h_{11} & \cdots & h_{1N_t} \\ \vdots & \ddots & \vdots \\ h_{N_r 1} & \cdots & h_{N_r N_t} \end{bmatrix} \quad (1)$$

-continued $$h_{ji} = \frac{\lambda}{4\pi d_{ji}} \exp(-jkd_{ji}) \cdot \frac{4\pi D}{\lambda} \approx \exp(-jkd_{ji}) \quad (2)$$

$$k = 2\pi/\lambda \quad (3)$$

$$\lambda = \frac{c}{f} \quad (4)$$

Where: dji is the length of the LoS path between the i-th TX antenna and the j-th RX. The parameters k and dji represent the physical distances between the antennas. In the MIMO antenna setup 900, Nt=Nr=2 and D is the distance between TX and RX. The antenna separation is dt, dr at the Tx and RX, respectively.

After defining the channel matrix and understanding the importance of the geometry in maintaining the orthogonality between the signal streams, as an example embodiment at f=140 GHz, embodiments of the present disclosure provide an antenna port switching algorithm in a Nt×Nr LoS MIMO channel. Embodiments of the present disclosure also provide a uniform linear array and are able to determine an optimum antenna element spacing (dt and dr) for any range D that maintains orthogonal signal streams. Herein, optimum antenna spacing references an antenna spacing that provides a maximum capacity as opposed to capacities provided by other spacings in the same environmental conditions. As an example, Nt=Nr=4 can be chosen (i.e, the transmitter has four antenna ports, and the receiver has four antenna ports). Embodiments of the present disclosure provide a system and method that is able to choose/select to use two antenna ports from the 4×4 MIMO architecture that maintain full rank and a condition number of 1 (i.e., optimal), which leads to a better BER performance. Certain embodiments of the present disclosure can be used for any Nt and Nr values greater than 1 (preserve MIMO).

Figure 10:
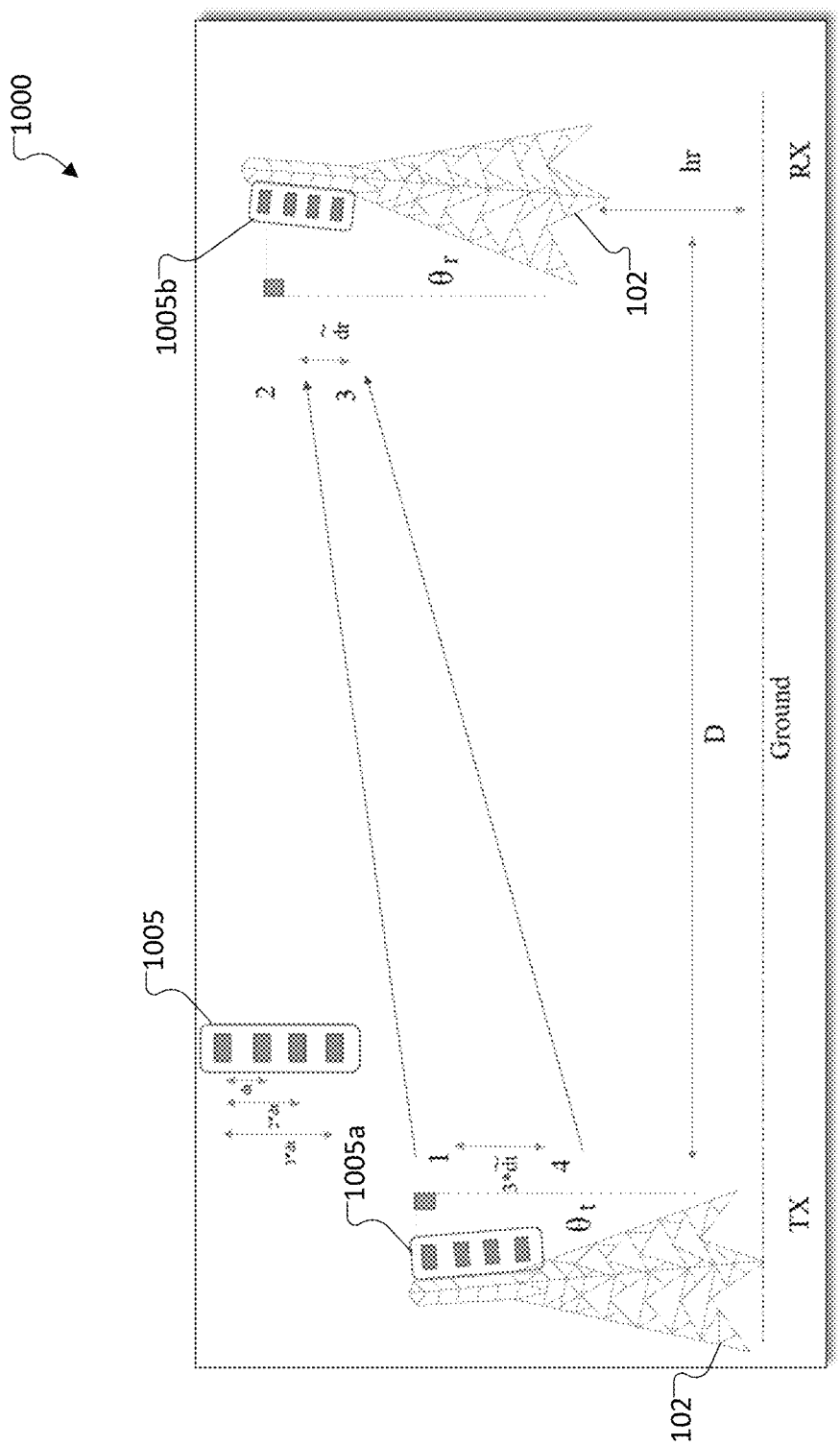
FIG. 10 illustrates an example 4×4 line-of-sight (LoS) MIMO system according to embodiments of the present disclosure.

FIG. 10 illustrates an example 4×4 LoS MIMO system according to embodiments of the present disclosure. The embodiment of the 4×4 LoS MIMO system 1000 shown in FIG. 8 is for illustration only. Other embodiments could be used without departing from the scope of the present disclosure.

In the example shown in FIG. 10, each base station, gNB 102 and gNB 103, is equipped with a four-port antenna array 1005. For example, gNB 102 includes four-port antenna TX array 1005a and gNB 103 includes four-port antenna RX array 1005b. Although a uniform linear four-port array 1005 is depicted, other geometric configurations could be used, such as square, polygon, or any other suitable geometric configuration. In certain embodiments, the ports are switched-on to preserve signal stream orthogonality. The TX, at gNB 102, has a tilted angle θt while the RX, at gNB 103, has a tilted angle θr. The base stations could be placed at any distance D and have different heights (ht and hr).

In certain embodiments, a design of an efficient antenna port switching technique for backhaul networks (in a mesh network) in near field LoS MIMO system is provided. In the mesh network, a transmitter base stations concurrently communicates with multiple receiver base stations. In the example depicted in FIG. 10, a single link transmission is depicted for clarity. That is, in certain embodiments, the communication is a single that is not part of a mesh network. In certain embodiments, the communication is a single link within a mesh network.

In the example depicted in FIG. 10, with respect to the communication between two base stations, each base station is equipped with four ports; that is, Nt=Nr=4 ports. The transmitter base station, eNB 102, is configured to select which two ports of the four to turn on (activate) to maintain signal stream orthogonality. The transmitter base station, eNB 102, can use channel matrix H, discussed previously. The antenna arrays 1005 are placed vertically on the respective base station since, in most actual scenarios, the environmental limitations are minor and because vertical placement may be less complicated than the horizontal installation that can be dictate large tilt angles. In the vertical installation, the differential height between the base station sites is considerably smaller than the geographical distance (h<<D), thus resulting in a small tilt angle ($\theta_t$, $\theta_r$). These tilt angles are important when calculating the inter element antenna spacing (dt, dr). Since a uniform linear array is utilized, the spacing between the elements is uniform. The values of dt and dr are calculated in such a way to preserve channel orthogonality. For dt and dr can be calculated according to:

$$d_t d_r = \frac{\lambda D}{V \cos(\theta_t)\cos(\theta_r)} K \quad (5)$$

In Equation 5, V=min(Nt,Nr) and K=1 for a minimum separation.

In the example depicted in FIG. 10, eNB 102 selects two ports for transmission and two ports for reception. For example, eNB 102 selects to transmit on the first and fourth port of four-port antenna TX array 1005a and the second and third ports of four-port antenna RX array 1005b are selected. The MIMO signal is transmitted at optimum capacity with gains $h_{12}$, $h_{13}$, $h_{42}$ and $h_{43}$.

Figure 11:
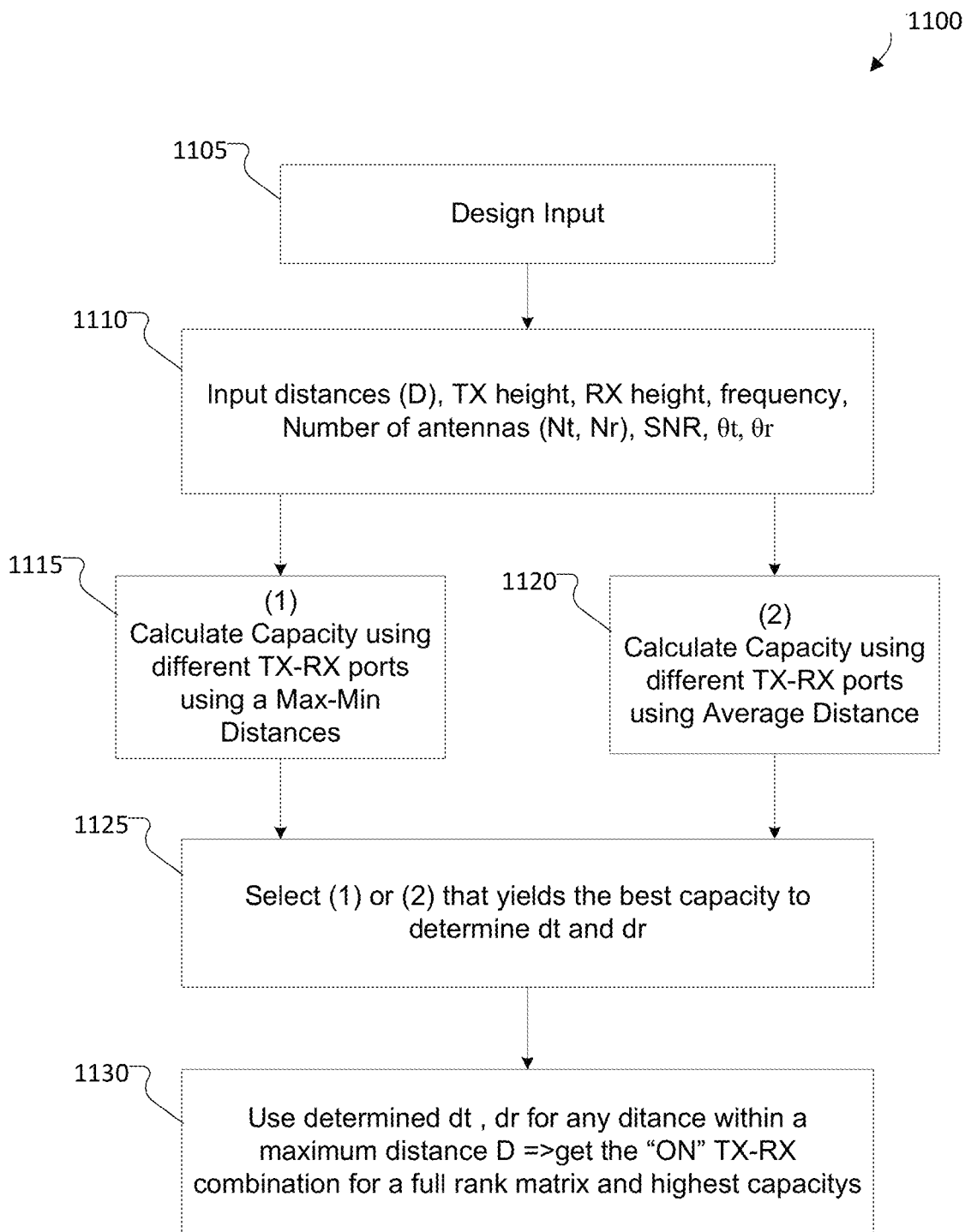
FIG. 11 illustrates an example optimization process according to embodiments of the present disclosure.

FIG. 11 illustrates an example optimization process 1100 according to embodiments of the present disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. Unless otherwise specified, the process depicted in the example depicted is implemented by a transmitter chain in, for example, a base station.

Since the distance of separation, height of the base station, and tilt angles can vary, determining an optimal dt and dr can be difficult. In certain embodiments, when designing the antenna array, the values for dt and dr will be constant for any location of the base stations. In certain embodiments, the optimization flow will follow the process 1100.

In operation 1105, a network designer inputs the different possible locations of the base stations. In addition to the locations, in operation 1110, the network designer inputs the distances (D) between base stations, the heights at both the TX and the RX, the frequency of operation, the number of antennas, the signal to noise ratio (SNR), and the tilt angles. In operation 1115, the processor 225 executes an optimization algorithm, such as a series of executable instructions stored in memory 230, to calculate one or more respective capacities using different TX-RX port combinations and using "D" as a maximum input distance through minimum input distance. In operation 1120, the processor 225 executes an optimization algorithm to calculate one or more respective capacities using different TX-RX port combinations and using "D" based on an average distance. In operation 1125, the processor 225 selects between the best "D" value determined between operation 1125 and 1120 that yields the highest capacity value. After determining the "D" value corresponding with the highest capacity, the processor 225 calculates dt and dr. In operation 1130, the processor uses the dt and dr calculated in operation 1125. That is, in operation 1130, now that dt and dr are fixed, the processor 225 selects a random distance location between the TX and RX. The optimization algorithm executed by the processor 225 will return which antenna ports should be switched on and which ones should be kept off at both TX and RX. Accordingly, in operation 1130, the processor 225 is configured to select which antenna ports to use to communicate with another base station based on parameters of eNB 102 and of the other base station, where the parameters include: a distance between the two base stations, a height; a base station structure; an antenna tilt angle; a number of antenna ports; and an antenna geometry.

Figures 12, 13:
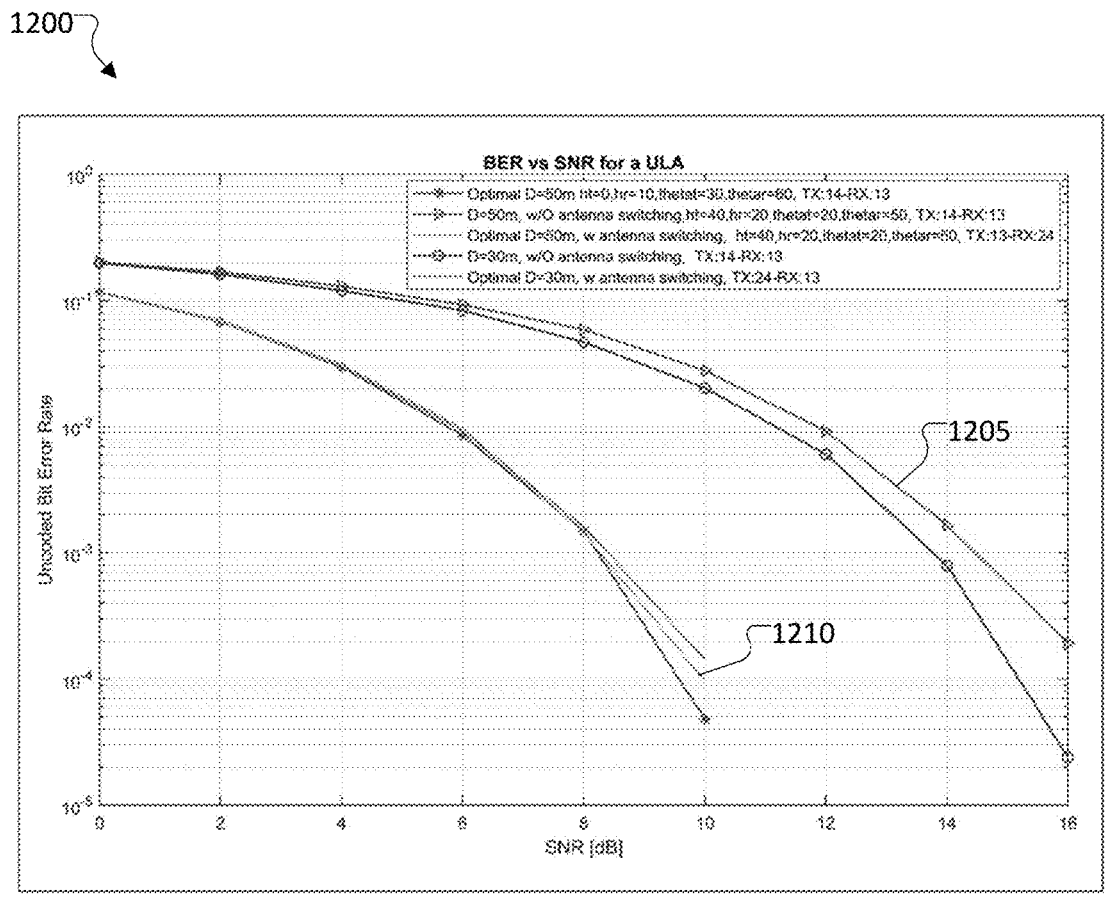
FIG. 12 illustrates example bit error rate performance according to embodiments of the present disclosure.
FIG. 13 illustrates example values for optimal TX-RX antennas according to embodiments of the present disclosure.

FIG. 12 illustrates example BER performance according to embodiments of the present disclosure. The embodiment of the BER performance 1200 shown in FIG. 12 is for illustration only. Other embodiments could be used without departing from the scope of the present disclosure.

In the example shown in FIG. 12, BERs for signals transmitted with and without antenna port switching are depicted. A set of possible locations are input for the base stations Drange=[10, 30, 50, 90, 100], hr=10 m, ht=0 m, θt=30°, θr=60°, SNR=10 dB and f=140 GHz. Based on the optimization process 1100, it is determined that dt=dr= [0.219, 0.439, 0.658] (i.e. [dt,2*dt,3*dt]). Fixing the dt and dr vector values, a uniform linear array is designed.

The table 1300 illustrated in FIG. 13 presents a set of different input combinations with and without antenna port switching using the same dt and dr vector values. When the TX and RX base stations are 50 m away (second row 1305) at different angles and heights, the TX ports that should be on are should be TX port-1 and TX port-3; and the RX ports that are on should be RX port-2 and RX-port-4.

Without antenna port switching and uses any set of ports without performing the optimization process 1100, the condition number of the matrix will no longer be 1, resulting in perform performance as shown in FIG. 12. In the BER performance 1200, the first curve 1205 corresponds to a full rank with an ill-conditioned number. Further, the second curve 1210, which corresponds to using antenna port switching, has a condition number of 1. It is noted that, in the examples shown in FIGS. 12 and 13, the transmitter uses QPSK modulation and sends a type-2 downlink over the designed channel matrix H. Controlling the switching will be through a programmable switch that will provides the command according to the highest spectral efficiency values. Additionally, in the example shown in FIG. 13, table 1300 shows a different combination that indicates the importance of antenna port switching; that is, in the third row 1310.

Figure 14:
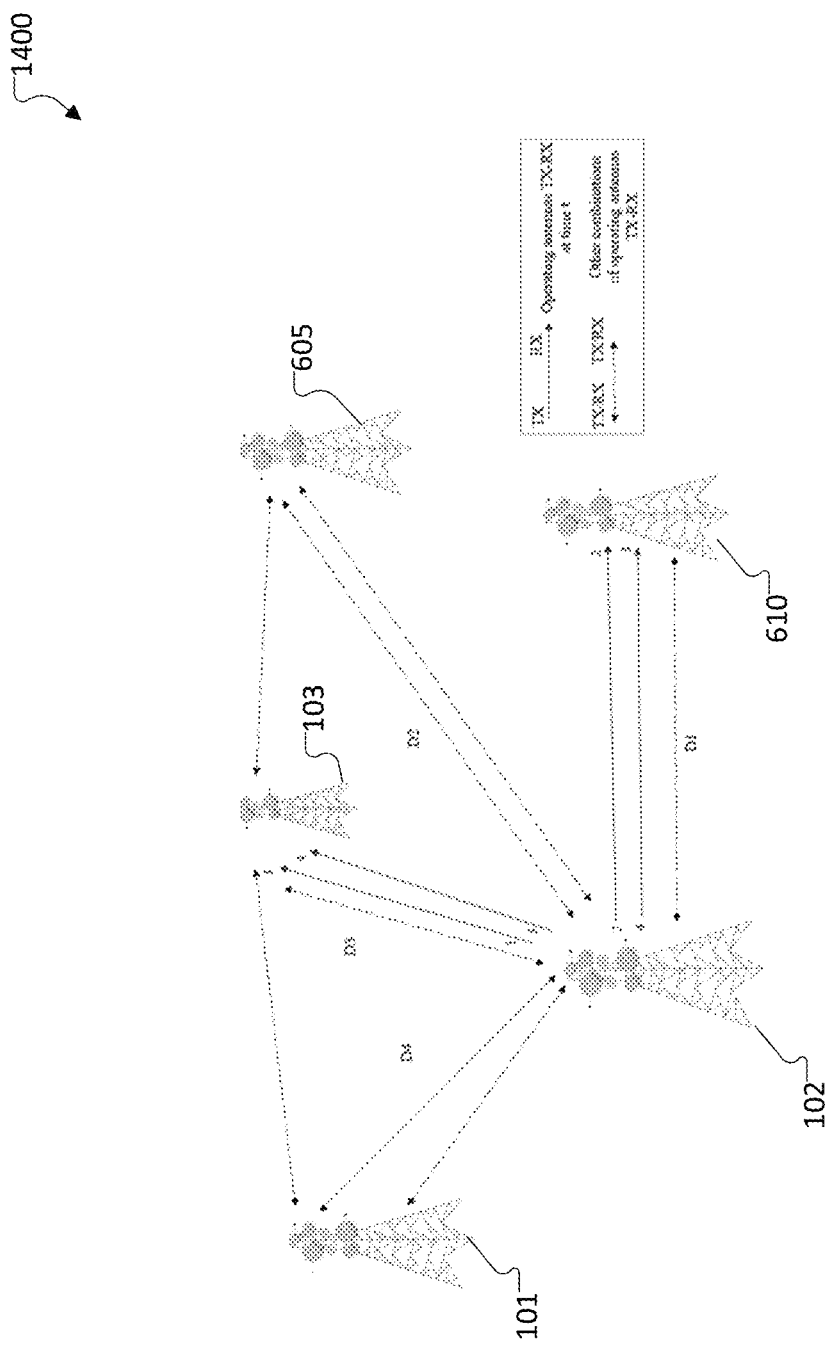
FIG. 14 illustrates an example LoS MIMO mesh backhaul communication according to embodiments of the present disclosure.

FIG. 14 illustrates an example LoS MIMO mesh backhaul communication according to embodiments of the present disclosure. The embodiment of the mesh network 1400 shown in FIG. 14 is for illustration only. Other embodiments could be used without departing from the scope of the present disclosure.

In certain embodiments, eNB 102 uses the optimization process 1100 in a mesh network 1400 with simultaneous transmission instead of one link at a time. The set of antenna ports that are not being used for one TX-RX combination can be made useful for other combinations. For example, eNB 102 can use a TX-RX combination of TX port-1 and TX port-3 and RX port 1 and RX port 4 at distant D3 to communicate with eNB 103. Additionally, eNB 102 can use a TX-RX combination of TX port-2 and TX port-4 and RX port 2 and RX port 3 at distance D1 to communicate with eNB 610. Additionally, eNB 102 can select a TX-RX combination for communication at distance D2 with eNB 605 and can select another TX-RX combination for communication at distance D4 with eNB 101.

In certain embodiments, a dual-polarization (H-V) is used in the disclosed antenna-port switching technique using the dual-polarization, the disclose antenna-port switching can achieve 4× the capacity, such as when using a C(4,2) combination a 2×2 performance is obtained. Adding dual polarization provides a 4×4 performance even when only using two streams.

In certain embodiments, non-uniform linear arrays are used to provide design flexibility. The spacing between the antenna elements can be non-uniform; but dt and dr vectors will remain equal. There are two ways to approach this solution. The first one essentially focuses on fixing the location of the first and last element, varying the elements in the middle, and obtaining the proper locations for optimal capacity. The second solution focuses on fixing the first element only and varying the other element locations while not exceeding the antenna's length constraint.

In certain embodiments, for higher spectral efficiency, three streams are selected out of the four, i.e., C(4,3) combination. Therefore, the base station will be choosing between sixteen combinations instead of thirty-six combinations.

In certain embodiments, the number of TX-RX antennas can be scaled up for a higher multiplexing and diversity gains, and hence have more combinations. In the examples depicted herein, a 4×4 MIMO system is used as an example; however, the antenna arrays can be scaled up while maintaining the size restriction of the antenna array.

Figure 15:
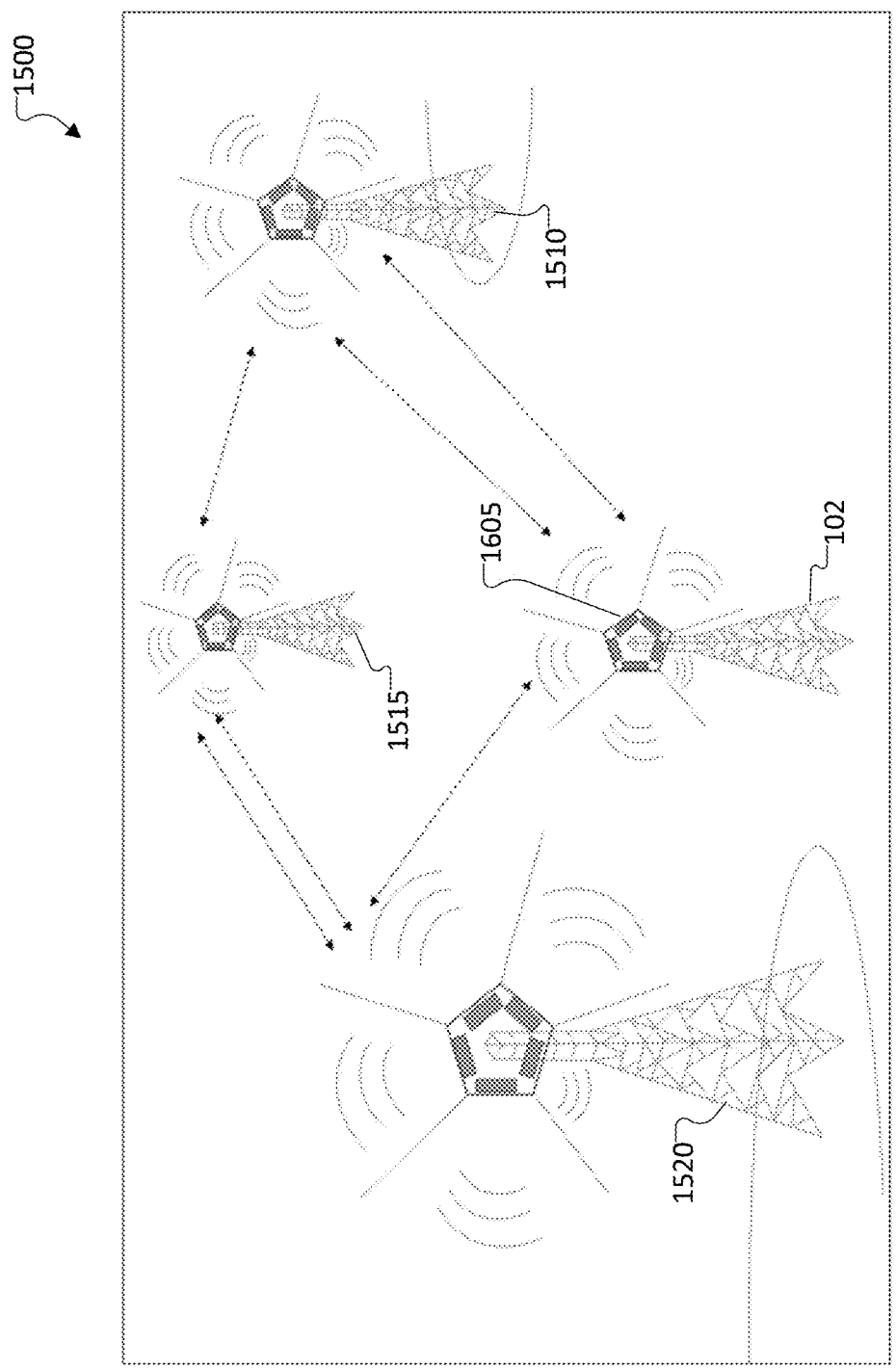
FIG. 15 illustrates an example mesh network according to embodiments of the present disclosure.

FIG. 15 illustrates an example mesh network according to embodiments of the present disclosure. The embodiment of the mesh network 1500 shown in FIG. 15 is for illustration only. Other embodiments could be used without departing from the scope of the present disclosure.

In certain embodiments, eNB 102 includes a polygon-like structure antenna array 1505, which increases the half power beam width angle. Additionally, one or more other base stations 1510, 1515, 1520 also include the polygon-like structure antenna array 1505. Therefore, each base station can now serve other base stations that were not within its vicinity. These polygon-like structure antenna array 1505 define a new type of antenna modeling, fabrication and material. The polygon-like structure antenna array 1505 will essentially operate in a similar manner when using the antenna port switching algorithm; however, the polygon-like structure antenna array 1505 will not be a uniform linear array.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A base station comprising:
an antenna array comprising a first number of antenna ports;
a transceiver configured to communicate in a wireless communication medium; and
a processor configured to:
determine, based on the wireless communication medium, one or more parameters of the base station or a receive base station;
determine, based on the one or more parameters, a first distance between at least two antenna ports of the base station and a second distance between at least two antenna ports of the receive base station; and
select, based on the first distance and the second distance, a second number of antenna ports to perform a communication with the receive base station.

2. The base station of claim 1, wherein the processor is configured to:
receive an input comprising base station locations in a mesh network; and
determine the first distance and the second distance by:
calculating a first capacity using a subset of different antenna ports of the base station and a subset of different antenna ports of the receive base station by subtracting a maximum distance between the base station and the receive base station with a minimum distance between the base station and the receive base station; and
calculating a second capacity using the subset of different antenna ports of the base station and the subset of different antenna ports of the receive base station based on an average distance between the base station and the receive base station.

3. The base station of claim 2, wherein the processor is configured to:
select a larger capacity between of the first capacity and the second capacity; and
based on the larger capacity, configure an antenna spacing.

4. The base station of claim 1, wherein the processor is configured to receive, as an input, the one or more parameters for at least the base station and the receive base station and a signal to noise ratio (SNR).

5. The base station of claim 1, wherein the one or more parameters comprises one or more of:
a base station height;
base station antenna tilt angles;
a frequency of operation;
a SNR;
one or more different distances between base stations in a mesh network;
a number of antenna ports at each of the base station and the receive base station; or
an antenna geometry.

6. The base station of claim 1, wherein the base station is further configured to communicate with the receive base station and another receive base station in a mesh network.

7. The base station of claim 1, wherein the one or more parameters comprise (i) a number of antenna ports at each of the base station and the receive base station, (ii) a frequency of operation, (iii) one or more different distances between base stations in a mesh network, and (iv) one or more base station antenna tilt angles.

8. A method comprising:
determining, based on a wireless communication medium, one or more parameters of a transmit base station or a receive base station;
determining, based on the one or more parameters, a first distance between at least two antenna ports of the transmit base station and a second distance between at least two antenna ports of the receive base station; and
selecting, based on the first distance and the second distance, a second number of antenna ports to perform a communication with the receive base station.

9. The method of claim 8, wherein determining the first distance and the second distance further comprises:
receiving an input comprising base station locations in a mesh network; and
determining the first distance and the second distance by:
calculating a first capacity using a subset of different antenna ports of the transmit base station and a subset of different antenna ports of the receive base station by subtracting a maximum distance between the transmit base station and the receive base station with a minimum distance between the transmit base station and the receive base station; and
calculating a second capacity using the subset of different antenna ports of the transmit base station and the subset of different antenna ports of the receive base station based on an average distance between the transmit base station and the receive base station.

10. The method of claim 9, further comprising:
selecting a larger capacity between of the first capacity and the second capacity; and
based on the larger capacity, configuring an antenna spacing.

11. The method of claim 8, further comprising:
receiving, as an input, the one or more parameters for at least the transmit base station and the receive base station and a signal to noise ratio (SNR).

12. The method of claim 8, wherein the one or more parameters comprises one or more of:
a base station height;
base station antenna tilt angles;
a frequency of operation;
a SNR;
one or more different distances between base stations in a mesh network;
a number of antenna ports at each of the transmit base station and the receive base station; or
an antenna geometry.

13. The method of claim 8, wherein the transmit base station communicates, via the wireless communication medium, with the receive base station and another receive base station in a mesh network.

14. The method of claim 8, wherein the one or more parameters comprise (i) a number of antenna ports at each of the transmit base station and the receive base station, (ii) a frequency of operation, (iii) one or more different distances between base stations in a mesh network, and (iv) one or more base station antenna tilt angles.

15. A non-transitory computer readable medium comprising a plurality of instructions that, when executed by at least one processor, cause the at least one processor to:
communicate in a wireless communication medium;
determine, based on the wireless communication medium, one or more parameters of a transmit base station or a receive base station;
determine, based on the one or more parameters, a first distance between at least two antenna ports of the transmit base station and a second distance between at least two antenna ports of the receive base station; and select, based on the first distance and the second distance, a second number of antenna ports to perform a communication with the receive base station.

16. The non-transitory computer readable medium of claim 15, wherein the instructions, when executed, further cause the processor to:

receive an input comprising base station locations in a mesh network; and determine the first distance and the second distance by:

calculating a first capacity using a subset of different antenna ports of the transmit base station and a subset of different antenna ports of the receive base station by subtracting a maximum distance between the transmit base station and the receive base station with a minimum distance between the transmit base station and the receive base station; and calculating a second capacity using the subset of different antenna ports of the transmit base station and the subset of different antenna ports of the receive base station based on an average distance between the transmit base station and the receive base station.

17. The non-transitory computer readable medium of claim 16, wherein the instructions, when executed, further cause the processor to:

select a larger capacity between of the first capacity and the second capacity; and based on the larger capacity, configure an antenna spacing.

18. The non-transitory computer readable medium of claim 15, wherein the instructions, when executed, further cause the processor to:

receive, as an input, the one or more parameters for at least the transmit base station and the receive base station and a signal to noise ratio (SNR).

19. The non-transitory computer readable medium of claim 15, wherein the one or more parameters comprises one or more of:

a base station height;

base station antenna tilt angles;

a frequency of operation;

a SNR;

one or more different distances between base stations in a mesh network;

a number of antenna ports at each of the transmit base station and the receive base station; or an antenna geometry.

20. The non-transitory computer readable medium of claim 15, wherein the one or more parameters comprise (i) a number of antenna ports at each of the transmit base station and the receive base station, (ii) a frequency of operation, (iii) one or more different distances between base stations in a mesh network, and (iv) one or more base station antenna tilt angles.

* * * * *